US008090033B2

(12) United States Patent
Lee

(10) Patent No.: US 8,090,033 B2
(45) Date of Patent: Jan. 3, 2012

(54) DIFFERENTIAL ORTHOGONAL MODULATION METHOD AND APPARATUS USING REPETITION TIME INTERVAL DIFFERENCE OF CHIRP SIGNAL

(75) Inventor: Kyung Kuk Lee, Seoul (KR)

(73) Assignee: Orthotron Co., Ltd., Seongnam-si (KR)

( * ) Notice: Subject to any disclaimer, the term of this patent is extended or adjusted under 35 U.S.C. 154(b) by 911 days.

(21) Appl. No.: 11/794,755

(22) PCT Filed: Dec. 28, 2005

(86) PCT No.: PCT/KR2005/004614
§ 371 (c)(1),
(2), (4) Date: Jul. 5, 2007

(87) PCT Pub. No.: WO2006/073243
PCT Pub. Date: Jul. 13, 2006

(65) Prior Publication Data
US 2008/0137717 A1    Jun. 12, 2008

(30) Foreign Application Priority Data

Jan. 5, 2005   (KR) .......................... 10-2005-0000667

(51) Int. Cl.
*H04K 1/10*    (2006.01)
*H04L 27/28*   (2006.01)
(52) U.S. Cl. ........................................ 375/260; 375/259
(58) Field of Classification Search ................... 375/260
See application file for complete search history.

(56) References Cited

U.S. PATENT DOCUMENTS

| | | | | |
|---|---|---|---|---|
| 5,898,399 A * | 4/1999 | Carrara et al. | ............... | 342/25 A |
| 6,064,695 A   | 5/2000 | Raphaeli et al. | | |
| 6,125,103 A * | 9/2000 | Bauml et al. | ................... | 370/203 |
| 6,188,717 B1* | 2/2001 | Kaiser et al. | ................... | 375/148 |
| 6,473,449 B1* | 10/2002 | Cafarella et al. | ............... | 375/141 |
| 6,606,052 B1* | 8/2003 | Miyahara | ........................ | 342/70 |

(Continued)

OTHER PUBLICATIONS

Takeuchi, Yoshihiko et al., "A chirp spread spectrum DPSK modulator and demodulator for a time shift multiple access communication system by using SAW devices," IEEE MTT-S International, *Microwave Symposium Digest*, vol. 2:507-510 (1998).

(Continued)

*Primary Examiner* — David C. Payne
*Assistant Examiner* — Erin File
(74) *Attorney, Agent, or Firm* — Nelson Mullins Riley & Scarborough LLP; EuiHoon Lee, Esq.

(57) ABSTRACT

A differential orthogonal modulation method and a differential orthogonal modulation apparatus using a repetition time interval difference of a chirp signal are disclosed. Such a differential orthogonal modulation method performed in a transmitter unit of a digital communication system comprises the steps of converting data having a serial bit format to be transmitted in the transmitter unit into a parallel format to create parallel input data, inputting the parallel input data into a symbol mapper, orthogonally modulating the parallel input data inputted into the symbol mapper to create modulated data comprised of differential bi-orthogonal functions, differentially encoding the modulated data to output encoded data, converting the encoded data into a serial bit format to create a baseband signal, and processing the baseband signal to create a transmission signal in a form of a chirp signal having a specific repetition time interval difference.

20 Claims, 7 Drawing Sheets

U.S. PATENT DOCUMENTS

| | | | |
|---|---|---|---|
| 6,654,926 B1 * | 11/2003 | Raphaeli et al. | 714/780 |
| 2004/0100897 A1 * | 5/2004 | Shattil | 370/206 |
| 2005/0174933 A1 * | 8/2005 | Sakoda et al. | 370/208 |
| 2006/0240787 A1 * | 10/2006 | An et al. | 455/118 |
| 2009/0110033 A1 * | 4/2009 | Shattil | 375/141 |

OTHER PUBLICATIONS

International Search Report for Application No. PCT/KR2005/004614, Dated Mar. 28, 2006.

* cited by examiner

| Differential Bi-Orthogonal Function | Data | Differential Bi-Orthogonal Function Value |
|---|---|---|
| $\psi_{1,2}(1)\psi_{3,3}(1)$ | 000 | 1　1　1　1 |
| | 100 | -1 -1 -1 -1 |
| $\psi_{1,2}(2)\psi_{3,3}(2)$ | 001 | 1　1　1 -1 |
| | 101 | -1　1 -1　1 |
| $\psi_{1,2}(3)\psi_{3,3}(3)$ | 010 | 1　1 -1 -1 |
| | 110 | -1 -1　1　1 |
| $\psi_{1,2}(4)\psi_{3,3}(4)$ | 011 | 1 -1 -1　1 |
| | 111 | 1　1　1 -1 |

FIG. 4

| Function | n | | | |
|---|---|---|---|---|
| $\psi_{i,j}(n)$ | 0 | 1 | 2 | 3 |
| $\psi_{1,2}(n)$ | 1 | 1 | 1 | 1 |
| $\psi_{2,2}(n)$ | 1 | -1 | 1 | -1 |
| $\psi_{3,3}(n)$ | 1 | 1 | -1 | -1 |
| $\psi_{2,1}(n)$ | 1 | -1 | -1 | 1 |

FIG. 5 ture, while it is improper when a receiver needs to have a simple structure or power consumption of the receiver needs to be small.

Meanwhile, a chirp signal is known as particularly suitable for measuring distance in a radar technology and so forth. A Surface Acoustic Wave (SAW) device is commonly used for detecting such a chirp signal. The SAW device refers to a device which propagates an elastic acoustic wave on an ultra-small sized substrate to perform a wide range of functions by using a property in which an acoustic wave propagating as an elastic acoustic wave within a crystalline solid can be produced by applying a mechanical impact on crystals or as a result of piezoelectric effects, and is used in a signal processing system.

A detection technology using this SAW device is a detection technology in which correlation values of a chirp signal are continuously derived over a time by using the SAW device on a receiver side, thereby using a point of time at which a correlation peak appears and the magnitude of the signal having the correlation peak for the detection. Although having the advantages that it has a high detection probability of the chirp signal and it detects the arrival time of the chirp signal accurately, such a detection technology also has a drawback in that the SAW device has a larger size and is rather expensive as compared with a digital semiconductor device.

Also, in order to form the whole transmitter/receiver apparatus as a System on Chip (SoC) by using a semiconductor technology, there is a need for developing a technology for detecting a chirp signal only by means of electronic circuitry without using the SAW device. With digital-type electronic circuitry being used for detecting the chirp signal, however, the detection is hard to achieve since a cross-correlation peak needs to be obtained by performing samplings at short intervals of about ¼ correlation width so as to detect the cross-correlation peak of very short width. However, when such a fast sampling frequency is used, the detection is not feasible because of an excessive amount of calculation.

DIFFERENTIAL ORTHOGONAL MODULATION METHOD AND APPARATUS USING REPETITION TIME INTERVAL DIFFERENCE OF CHIRP SIGNAL

Related Applications

This application is a 35 U.S.C. 371 national stage filing of International Application No. PCT/KR2005/004614, filed Dec. 28, 2006 which claims priority to Korean Patent Application No. 2005-00667 filed on Jan. 5, 2005. The contents of the aforementioned applications are hereby incorporated by reference.

TECHNICAL FIELD

The present invention relates to a differential orthogonal modulation method and a differential orthogonal modulation apparatus using a repetition time interval difference of a chirp signal. More particularly, the present invention relates to a differential orthogonal modulation method and a differential orthogonal modulation apparatus, in which a chirp signal is modulated such that its repetition time interval difference is differentiated from modulator to modulator, the modulated chirp signal is transmitted, and differential detection is performed on a receiver side by using a repetition time interval difference having been used in a specific transmitter, thereby, according to such a characteristic of the chirp signal, causing only a transmission signal having been modulated with the same time interval as a repetition time interval of chirp signal detection in a receiver to be detected as a correlation peak of the chirp signal in a differential detector.

BACKGROUND ART

"Modulation" refers to an operation in which data is converted into a suitable form for transmission by usually carrying the data on a carrier in order to transmit information or data from one point to another point or from a first apparatus to a second apparatus through a communication line or a radio link. After received by the second apparatus, the modulated data is demodulated, that is, is restored to a suitable form to be subsequently used in the second apparatus by removing the carrier.

According to signal waves expressing information to be transmitted, such modulation includes various modulation schemes such as amplitude, frequency and time modulation schemes for a high frequency current or voltage of a sine wave, a periodic pulse or the like.

Orthogonal modulation as one of various modulation schemes is a modulation scheme using an orthogonal code in the modulation, and is characterized in that it is suitable for systems having a limitation on available power because a Signal-to-Noise Ratio (SNR) per bit required for attaining a given bit error rate goes lower as a modulation dimension increases.

When a coherent detection technology is used on a receiver side in order to restore data modulated in the orthogonal modulation scheme, this coherent detection technology has an advantage in that signal detection can be accurately made because of its relatively superior SNR characteristic, but also has a drawback in that a receiver for the coherent detection has a complicated structure and it takes a long time to fix coherence. Therefore, the coherent detection technology may be a good option when the required level of the SNR characteristic of a receiver is high in spite of its complicated struc-

DISCLOSURE OF THE INVENTION

Therefore, the present invention has been made in view of the above-mentioned problems, and it is an object of the present invention to provide a differential orthogonal modulation method and a differential orthogonal modulation apparatus using a repetition time interval difference of a chirp signal, in which a chirp signal is modulated such that its repetition time interval difference is differentiated from modulator to modulator, the modulated chirp signal is transmitted, and differential detection is performed on a receiver side by using a repetition time interval difference having been used in a specific transmitter, thereby, according to such a characteristic of the chirp signal, causing only a transmission signal having been modulated with the same time interval as a repetition time interval of chirp signal detection in a receiver to be detected as a correlation peak of the chirp signal in a differential detector, and causing other transmission signals having different repetition time intervals to deviate from the correlation peak by their time interval differences and so have a correlation value of 0, so as to avoid interferences from other transmission signals.

In accordance with one aspect of the present invention, there is provided a method for performing differential orthogonal modulation in a transmitter unit of a digital communication system by using a repetition time interval difference of a chirp signal, the method comprising the steps of: (a) converting data having a serial bit format to be transmitted in the transmitter unit into a parallel format to create parallel input data; (b) inputting the parallel input data into a symbol mapper; (c) orthogonally modulating the parallel input data inputted into the symbol mapper to create modulated data comprised of differential bi-orthogonal functions; (d) differentially encoding the modulated data to output encoded data; (e) converting the encoded data into a serial bit format to create a baseband signal; and (f) processing the baseband signal to create a transmission signal in a form of a chirp signal having a specific repetition time interval difference.

In accordance with another aspect of the present invention, there is provided an apparatus for performing differential orthogonal modulation in a transmitter unit of a digital communication system by using a repetition time interval difference of a chirp signal, the apparatus comprising: a serial-to-parallel converter for converting data having a serial bit format to be transmitted in the transmitter unit into a parallel format to create parallel input data; a symbol mapper for receiving the parallel input data from the serial-to-parallel converter and orthogonally modulating the parallel input data to create modulated data comprised of differential bi-orthogonal functions; a differential encoder for differentially encoding the modulated data to output encoded data; a parallel-to-serial converter for converting the encoded data into a serial bit format to create a baseband signal; and a chirp signal generator for processing the baseband signal to create a transmission signal in a form of a chirp signal having a specific repetition time interval difference.

BRIEF DESCRIPTION OF THE DRAWINGS

The foregoing and other objects, features and advantages of the present invention will become more apparent from the following detailed description when taken in conjunction with the accompanying drawings in which:

FIG. 4 is a table showing a conversion method applied to a symbol mapper in accordance with a preferred embodiment of the present invention;

FIG. 5 is a table showing an example of a discrete differential orthogonal function set in accordance with a preferred embodiment of the present invention;

BEST MODE FOR CARRYING OUT THE INVENTION

Figure 1:
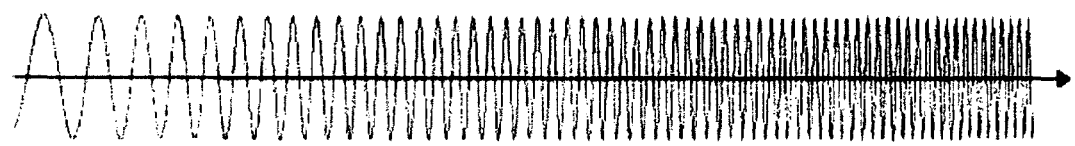
FIG. 1 is a view graphically expressing a real part of a chirp signal.

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

A chirp signal according to a preferred embodiment of the present invention, which is also referred to as a linear chirp, is expressed by Equation (1):

$$Chirp(t) = \exp\left[\left(\omega_s + \frac{\omega_{BW}}{2T_{chirp}}t\right)t\right] \times [u(t) - u(t - T_{chirp})] \quad (1)$$

where, $\omega_s$ denotes an initial frequency of the chirp signal, $T_{chirp}$ denotes a duration time of the chirp signal, $\omega_{BW}$ denotes a bandwidth of the chirp signal, and u(t) denotes a unit step function.

As seen from Equation (1), such a chirp signal has a characteristic that its frequencies are different at the beginning and at the end of the signal, and varies linearly therebetween.

Equation (2) is an expression taking only a real part from Equation (1):

$$Chirp(t) = \cos\left[\left(\omega_s + \frac{\omega_{BW}}{2T_{chirp}}t\right)t\right] \times [u(t) - u(t - T_{chirp})] \quad (2)$$

FIG. 1 graphically illustrates the real part of the chirp signal according to Equation (2).

Referring to FIG. 1, it can be seen that the chirp signal starts with a low frequency, gradually varies to higher frequencies, and then ends at a point of time when the total amount of frequency variation becomes $\omega_{BW}$.

The chirp signal has advantage that it itself has an excellent cross-correlation characteristic.

Figure 2:
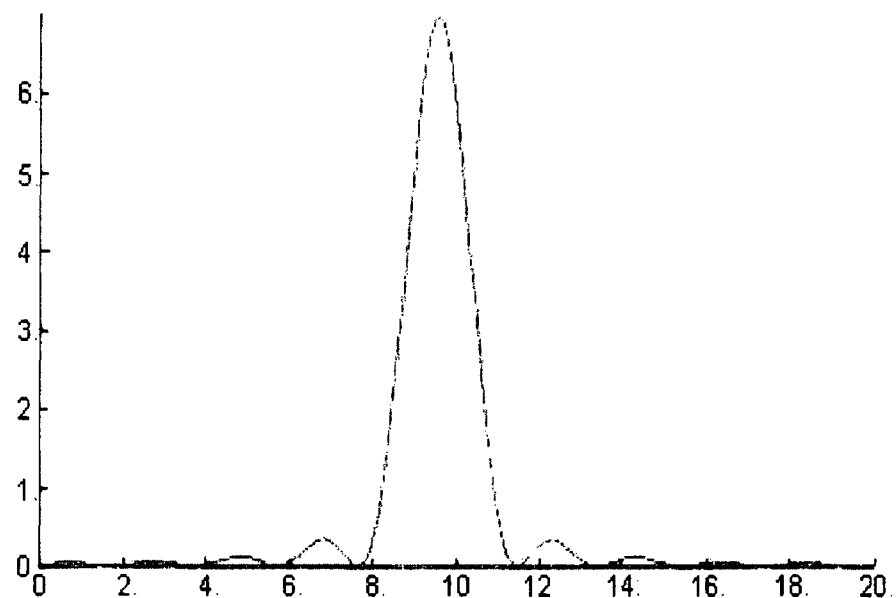
FIG. 2 is a view graphically illustrating a correlation characteristic between two chirp signals.

FIG. 2 illustrates a correlation characteristic between two chirp signals.

It can be seen from FIG. 2 that a correlation peak appears when the two chirp signals coincide with each other at the same point of time, and a correlation value between the two chirp signals abruptly decrease to a very small value if their positions deviate from each other to the right or left side, for example, deviate from the point of time of the correlation peak in FIG. 2 by 2 or more.

The chirp signal has another advantage that its overall energy can be made large even at a low voltage due to signal lengthening along a time axis and a received signal having a short but high voltage can be made when cross-correlation is taken at a receiver side, which results in accurately detecting a point of arrival time of the signal. Owing to this advantages of the chirp signal, it has been used for measuring distance in the radar field.

In the present invention, a differential encoding of the chirp signal is performed in a modulator unit of a transmitter and a differential detection is performed in a demodulator unit of a receiver by using such characteristics and a repetition time interval difference of the chirp signal, thereby enabling the chirp signal to be easily detected without any interference.

Figure 3:
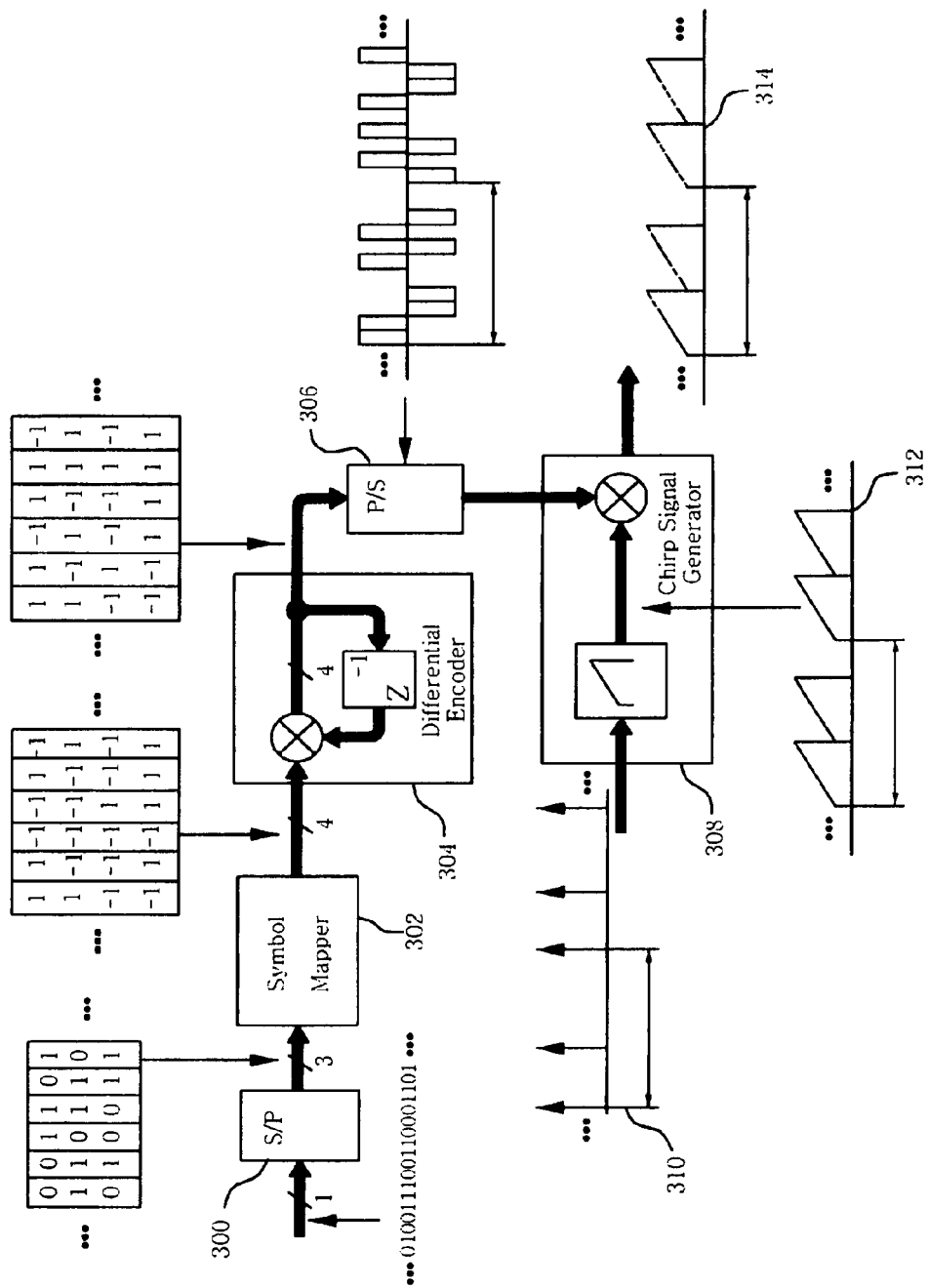
FIG. 3 is a block diagram illustrating the structure of a differential orthogonal modulation apparatus using repetition time interval difference of a chirp signal in accordance with a preferred embodiment of the present invention.

FIG. 3 illustrates the structure of a differential orthogonal modulation apparatus using a repetition time interval difference of a chirp signal according to a preferred embodiment of the present invention.

As shown in FIG. 3, the differential orthogonal modulation apparatus using a repetition time interval difference of a chirp signal according to the preferred embodiment of the present invention may include a serial-to-parallel (S/P) converter 300, a symbol mapper 302, a differential encoder 304, a parallel-to-serial (P/S) converter 306, and a chirp signal generator 308.

The serial-to-parallel converter 300 according to the preferred embodiment of the present invention is an apparatus for converting input data having a serial bit format into a parallel format. Referring to FIG. 3, the serial-to-parallel converter 300 inputs 3-bit data in bundle into the symbol mapper 302 to be described below.

The symbol mapper 302 according to the preferred embodiment of the present invention receives the input data having the parallel format from the serial-to-parallel converter 300 and orthogonally modulates the received input data to create modulated data comprised of differential bi-orthogonal functions. Referring to FIG. 4, the symbol mapper 302 according to the preferred embodiment outputs data inputted by a unit of 3 bits pursuant to a conversion method shown in FIG. 4.

Here, an orthogonal code for the orthogonal modulation in the symbol mapper 302 according to the preferred embodiment may be a differential bi-orthogonal function set or a discrete differential bi-orthogonal function set. Whether or not a signal is detected in a receiver is determined by the orthogonal code used for the orthogonal modulation and a repetition time interval difference of a chirp signal to be described later.

In general, an orthogonal function set can be expressed by Equation (3):

$$\frac{1}{T}\int_0^T \varphi_l(t)\varphi_m^*(t)\,dt = \begin{cases} 1 & l=m \\ 0 & l \neq m \end{cases} \quad (3)$$

where, l, m=1, 2, ..., N.

In Equation (3), $\phi_{(i)}(t)$ (i=1, 2, ..., N−1) denotes basis functions, and $\phi^*(t)$ denotes conjugate complex functions with respect to $\phi(t)$.

That is, period (T) integration for multiplication between the same basis functions becomes a value of 1, and period (T) integration for multiplication between different basis functions becomes a value of 0.

In the differential orthogonal modulation according to a preferred embodiment of the present invention, a differential orthogonal function set is used as in Equation (4):

$$\frac{1}{T} = \int_0^T \psi_{k,l}(t)\psi_{l,m}(t)\psi_{i,j}^*(t)\,dt \quad (4)$$

$$= \frac{1}{T}\int_0^T \varphi_k(t)\varphi_l^*(t)\varphi_l(t)\varphi_m^*(t)\varphi_i^*(t)\varphi_j(t)\,dt$$

$$= \begin{cases} 1 & k=i, m=j \\ 0 & \text{otherwise} \end{cases}$$

where, $\psi_{i,j}(t)=\phi_i(t)\phi_j^*(t)$, i, j=1, 2, ..., N.

In Equation (4), $\psi_{i,j}(t)$ (i, j=1, 2, ..., N) denotes basis functions having a differential orthogonal characteristic. As shown in Equation (4), the differential orthogonal function according to the preferred embodiment of the present invention can be produced by multiplication of general orthogonal functions $\phi(t)$.

A left term of Equation (4) is formed by multiplication of three differential orthogonal functions, and is equivalent to a multiplication of six general orthogonal functions as in a middle term of Equation (4). The basis functions may be configured such that when each two basis functions of the six general orthogonal functions are composed of a complex conjugate function pair, that is when k=i and m=j in Equation (4), the overall integration value of Equation (4) becomes 1, and otherwise, the overall integration value of Equation (4) becomes 0.

A complex sinusoidal function of Equation (5) may be exemplified as the differential orthogonal function set having the above-mentioned characteristic:

$$\psi_{k,l}(t)=\exp[j(k\omega_0 t)]\times\exp[-j(l\omega_0 t)]k,l=1,2,\Lambda,N \quad (5)$$

The differential orthogonal function as described above corresponds to those in a case of a continuous time function, and a differential orthogonal function in a case of a discrete time function may be described in a similar manner.

In general, a discrete orthogonal function set can be expressed by Equation (6):

$$\frac{1}{N}\sum_{n=0}^{N-1}\varphi_l(n)\varphi_m^*(n) = \begin{cases} 1 & l=m \\ 0 & l \neq m \end{cases} \quad (6)$$

where, l, m=1, 2, ..., N.

In Equation (6), $\phi_{(i)}(n)$ (i=1, 2, ..., N−1) denotes basis functions, and $\phi^*(n)$ denotes conjugate complex functions with respect to $\phi(n)$.

That is, period (N) summation for multiplication between the same basis functions becomes a value of 1, and period (N) summation for multiplication between different basis functions becomes a value of 0.

Here, a discrete differential orthogonal function set is expressed by Equation (7):

$$\frac{1}{N} = \sum_{n=0}^{N-1}\psi_{k,l}(n)\psi_{l,m}(n)\psi_{i,j}^*(n) \quad (7)$$

$$= \frac{1}{N}\sum_{n=0}^{N-1}\varphi_k(n)\varphi_l^*(n)\varphi_l(n)\varphi_m^*(n)\varphi_i^*(n)\varphi_j(n)$$

$$= \begin{cases} 1 & k=i, m=j \\ 0 & \text{otherwise} \end{cases}$$

where, $\psi_{i,j}(n)=\phi_i(n)\phi_j^*(n)$, i, j=1, 2, ..., N.

In Equation (7), $\psi_{i,j}(n$ (i, j=1, 2, ..., N) denotes basis functions having a discrete differential orthogonal characteristic. As shown in Equation (7), the discrete differential orthogonal function according to the preferred embodiment of the present invention can be produced by multiplication of general discrete orthogonal functions $\phi(n)$.

A left term of Equation (7) is formed by multiplying three discrete differential orthogonal functions, and is equivalent to multiplication of six general discrete orthogonal functions as in a middle term of Equation (7). The basis functions may be configured such that when each two basis functions of the six general discrete orthogonal functions are composed of a complex conjugate function pair, that is when k=i and m=j in Equation (7), the overall summation of Equation (7) yields 1, and otherwise, the overall summation value of Equation (7) yields 0.

A Walsh function as shown in FIG. 5 may be exemplified as the discrete differential orthogonal function set having the above-mentioned characteristic.

The differential encoder 304 according to the preferred embodiment of the present invention receives the modulated data from the symbol mapper 302 and differentially encodes the modulated data to output encoded data. The encoded output data passes through the parallel-to-serial converter 306, which creates a baseband signal from the encoded output data.

The chirp signal generator 308 according to the preferred embodiment of the present invention processes the baseband signal received from the parallel-to-serial converter 306 to create a transmission signal in the form of a chirp signal having a specific repetition time interval difference. Here, a signal 310 inputted into the chirp signal generator 308 is an impulse signal inputted from an impulse generator (not shown). If this impulse signal is inputted into the chirp signal generator 308, a chirp signal 312 is generated at every impulse position. In a preferred embodiment of the present invention, transmission signals are distinguished from each other by giving a difference in the generation time interval of the chirp signal. FIG. 3 shows that two different time intervals are repeated alternately.

As shown in FIG. 3, a final transmission signal 314 is comprised of a chirp signal having a difference in its repetition time interval. FIG. 3 shows an example in which two different repetition time interval differences are repeated alternately, and the two repetition time intervals of the chirp signal have the same period.

Figure 6:
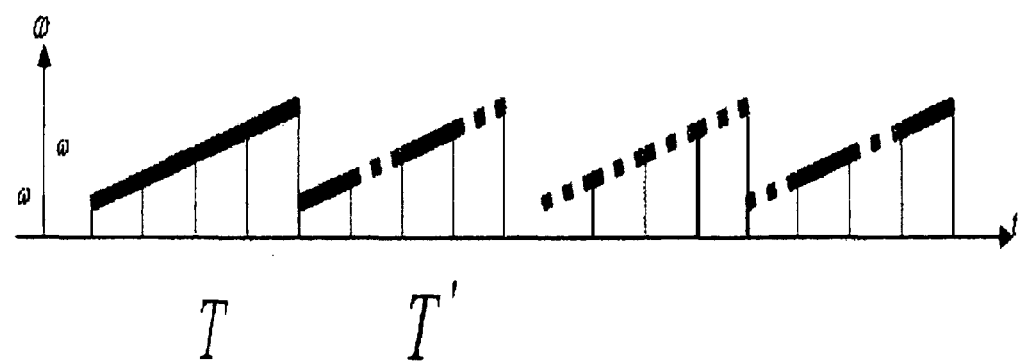
FIG. 6 is a view graphically illustrating an example of a chirp signal having a repetition time interval difference in accordance with a preferred embodiment of the present invention.

This can be more apparent from FIG. 6 illustrating an example in which two different time intervals T and T' between chirp signals are repeated alternately. By giving a difference in the generation time interval of the chirp signal in this way, whether to detect a signal in a receiver is determined according to the repetition time interval of the chirp signal, which has been set in the chirp signal generator 308.

In FIG. 6, a solid line designates a case where a chirp phase is positive, and a dotted line designates a case where a chirp phase is negative.

Figure 7:
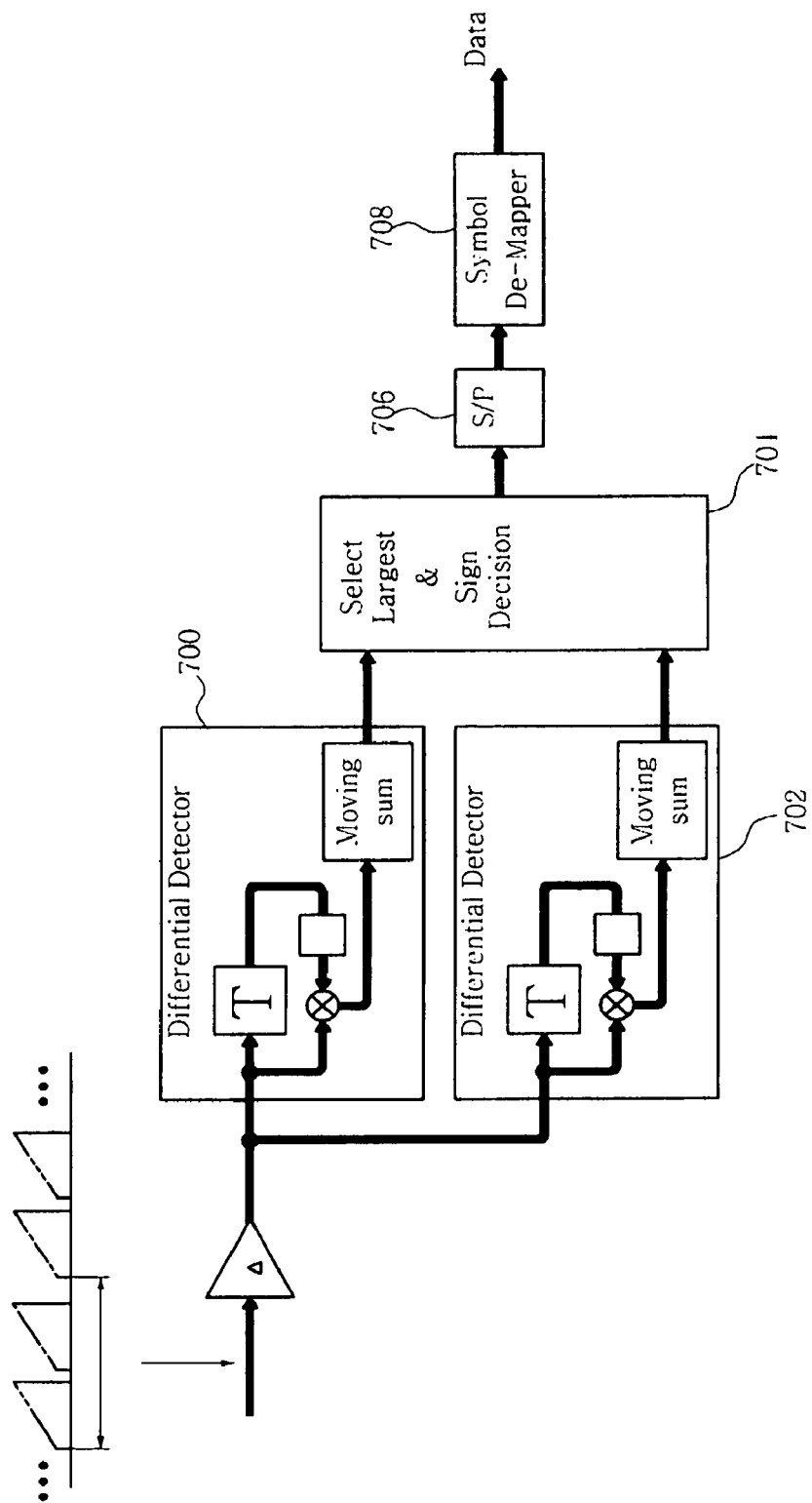
FIG. 7 is a block diagram illustrating the structure of a differential orthogonal demodulation apparatus using a repetition time interval difference of a chirp signal in accordance with a preferred embodiment of the present invention.

FIG. 7 illustrates a differential orthogonal demodulation apparatus using a repetition time interval difference of a chirp signal according to a preferred embodiment of the present invention.

As shown in FIG. 7, the differential orthogonal demodulation apparatus using a repetition time interval difference of a chirp signal according to the preferred embodiment of the present invention may include differential detectors 700, 702, a selector 704, a serial-to-parallel converter 706, and a symbol de-mapper 708.

The differential detectors 700, 702 according to the preferred embodiment of the present invention receives a transmission signal in the form of a chirp signal from the orthogonal modulator in FIG. 3, differentially decodes the transmission signal by using a repetition time interval difference set in a receiver to create output values, and outputs a moving sum of the output values.

In FIG. 7, the differential detector designated by reference numeral "700" is used for detecting a chirp signal having a time interval of "T". If the chirp signal having a time interval of "T" is repeatedly inputted into the differential detector 700, a correlation peak is outputted and detected as a moving sum as shown in FIG. 2. In contrast with this, if a chirp signal having not a time interval of "T" is repeatedly inputted, a correlation value close to 0 is outputted as a moving sum in FIG. 2.

Similarly, the differential detector designated by reference numeral "702" is used for detecting a chirp signal having a time interval of "T'". If the chirp signal having a time interval of "T'" is repeatedly inputted into the differential detector 702, a correlation peak is outputted and detected as a moving sum as shown in FIG. 2. In contrast with this, if a chirp signal having other than a time interval of "T'" is repeatedly inputted, a correlation value close to 0 is outputted as a moving sum in FIG. 2.

The selector 704 according to his embodiment of the present invention selects a signal, the moving sum of which is maximal, from among the signals differentially detected by the differential detectors 700, 702. If a chirp signal having a time interval of "T" is repeatedly inputted into the differential detectors 700, 702, an output from the differential detector designated by reference numeral "700" would be selected because the output from the differential detector designated by reference numeral "700" is greater than that from the differential detector designated by reference numeral "702".

The serial-to-parallel converter 706 according to the preferred embodiment of the present invention converts the output of the chirp signal selected in the selector 704 into parallel data having a parallel format and then delivers the converted parallel data to the symbol de-mapper 708 to be described below.

The symbol de-mapper 708 according to the preferred embodiment of the present invention receives the parallel data from the serial-to-parallel converter 706, and detects input data by using orthogonal symbols mapped with the parallel data. According to a preferred embodiment of the present invention, the symbol de-mapper 708 inversely applies the conversion table of FIG. 4 to the output from the serial-to-parallel converter 706.

In brief, when a signal modulated with other orthogonal code than that used for the modulation in the differential orthogonal modulation apparatus of FIG. 3 is inputted into a transmission signal in the form of a chirp signal or when a repetition time interval, different from that used for generating a chirp signal in the chirp signal generator 308, is set in the receiver of FIG. 7, all of the outputs from the differential detectors 700, 702 become 0 or very small values and thus are not detected. In view of this feature of the present invention, if chirp signals having different orthogonal codes or different repetition time interval differences are used according to a preferred embodiment of the present invention, it is possible to differentiate between the signals according to the orthogonal codes or the repetition time intervals on the receiver side, and thus interferences between communication terminals can be prevented.

Figure 8:
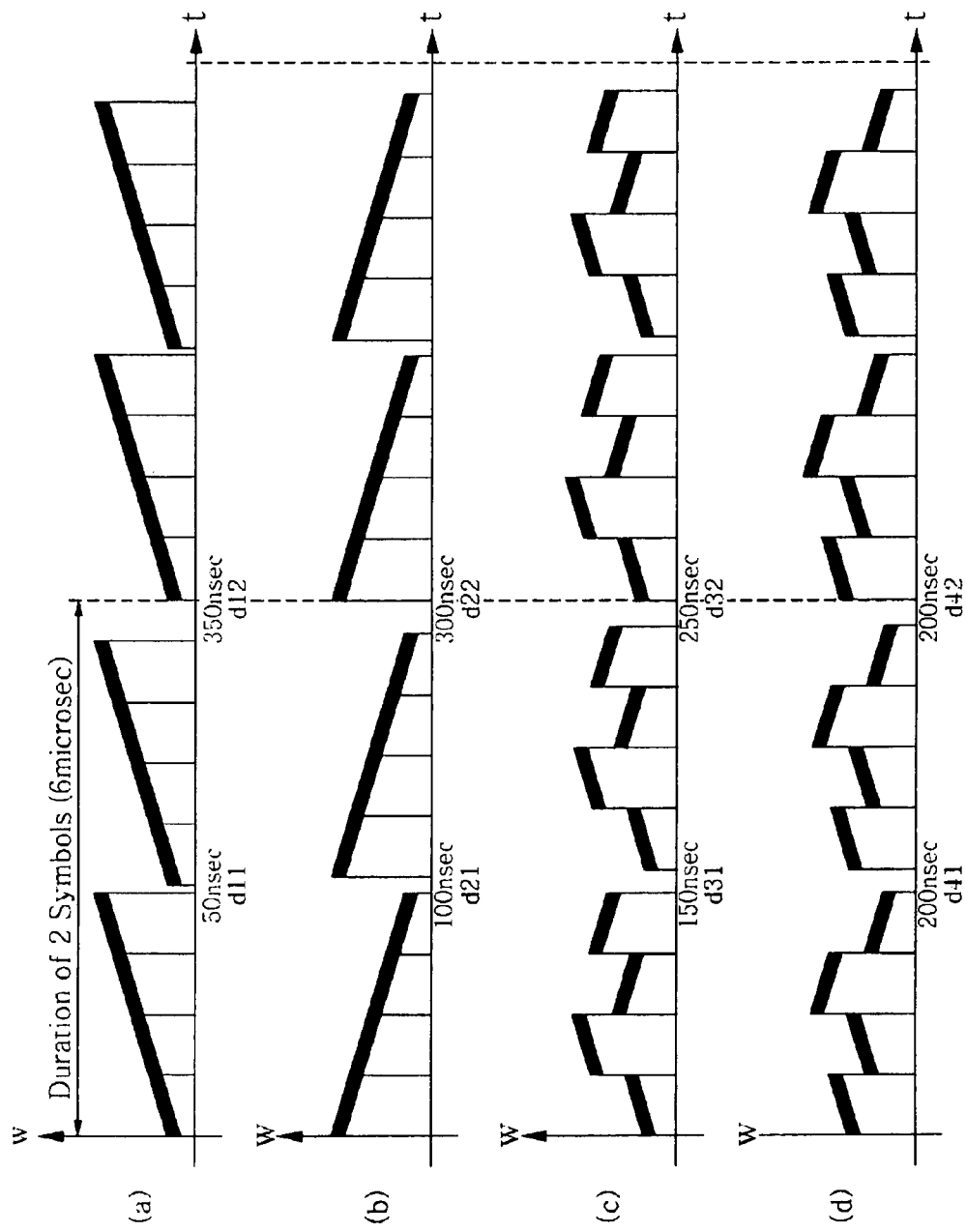
FIG. 8 is a view graphically illustrating various forms of a chirp signal in accordance with a preferred embodiment of the present invention.

FIG. 8 illustrates various forms of a chirp signal in accordance with a preferred embodiment of the present invention.

In FIG. 8, there are examples of chirp signals, the repetition time interval differences of which are different from one another. That is, (a), (b), (c) and (d) of FIG. 8 represent different combinations of short-interval sub-chirp signals. Of them, (a) represents a chirp signal comprised of only four sub-up-chirp signals, (b) represents a chirp signal comprised of only four sub-down-chirp signals, and (c) and (d) represent non-linear chirp signals comprised of combinations of sub-up-chirp signals and sub-down-chirp signals, respectively.

In a preferred embodiment of the present invention, chirp signals having different repetition time interval difference between the respective sub chirp signals are transmitted regardless of the configurations of the chirp signals. Therefore, a correlation peak is outputted at an output of a detector in which a differential detection time interval of a chirp signal is the same as the repetition time interval of a transmission signal, and a correlation value of 0 is outputted at an output of a detector in which a differential detection time interval of a chirp signal is different from the repetition time interval of a transmission signal. That is, by using the repetition time interval differences of the chirp signals alone, transmission signals having mutual quasi-orthogonal characteristics can be achieved. In other words, even though only sub-up-chirp signals of (a) are used, the same orthogonal characteristics can be attained by different combinations of time intervals as shown in (b), (c) and (d). Further, when the configurations and time intervals of the respective chirp signals are all different from one another as in FIG. 8, there is an additional advantage that a correlation coefficient between signals can be minimized even if the overlapping time of the signals is randomly changed.

Figure 9:
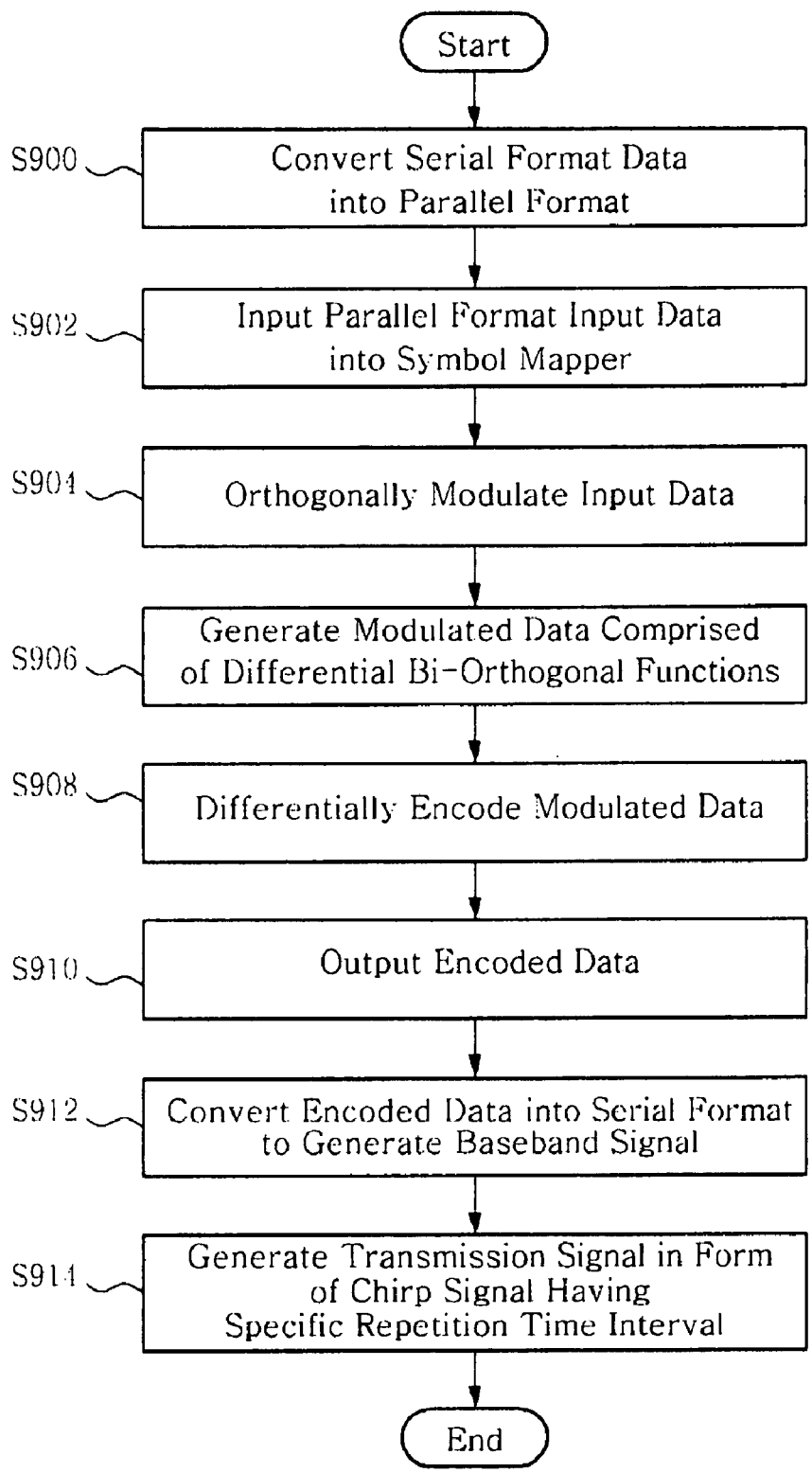
FIG. 9 is a flowchart illustrating a differential orthogonal modulation process using a repetition time interval difference in accordance with a preferred embodiment of the present invention.

FIG. 9 is a flowchart illustrating a differential orthogonal modulation process using a repetition time interval difference in accordance with a preferred embodiment of the present invention.

According to the preferred embodiment of the present invention, first of all, the serial-to-parallel converter 300 converts input data having a serial bit format into a parallel format (S900). The converted input data is inputted from the serial-to-parallel converter 300 into the symbol mapper 302 (S902).

The symbol mapper 302 receives the input data having the parallel format from the serial-to-parallel converter 300 and orthogonally modulates the received input data (S904) to create modulated data comprised of differential bi-orthogonal functions (S906). Here, an orthogonal code used for the orthogonal modulation in the symbol mapper 302 may be a differential bi-orthogonal function set or a discrete differential bi-orthogonal function set.

Next, the differential encoder 304 receives the modulated data from the symbol mapper 302 and differentially encodes the modulated data (S908) to output encoded data (S910). The encoded output data passes through the parallel-to-serial converter 306, which creates a baseband signal from the encoded output data (S912).

The chirp signal generator 308 processes the baseband signal created in the parallel-to-serial converter 306 to create a transmission signal in the form of a chirp signal having a specific repetition time interval difference (S914).

Such a transmission signal is received by a receiver unit of a communication system. The receiver unit differentially decodes the transmission signal transmitted from the chirp signal generator 308 and converts the decoded signal by using an inherent repetition time interval difference allocated thereto to detect input data.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As described above, according to the present invention, a chirp signal having a specific repetition time interval difference is used in a modulator of a digital communication transmitter unit. Thus, on a receiver side, it is possible to receive the chirp signal by means of a simple-structure demodulator using differential detection in place of SAW device detection. Also, if chirp signals having different repetition time intervals are used, the receiver side can receive the signals through de-multiplexing even when multiple users simultaneously perform multiple accesses through the same medium.

Moreover, in order to further lower a correlation value between chirp signals having different repetition time intervals, a variety types of chirp signals such as a combination of up-chirp and down-chirp signals, a recombination of sub-chirp signals into which one chirp signal are divided equally over a time and the like can be used for improving the degree of separation between the chirp signals having different repetition time intervals.

The invention claimed is:

1. A method for performing a differential orthogonal modulation in a transmitter unit of a digital communication system by using a chirp signal sequence with at least two different time gaps, the method comprising the steps of:
   (a) converting data having a serial bit format into a parallel format to generate parallel input data;
   (b) inputting the parallel input data into a symbol mapper;
   (c) orthogonally modulating the parallel input data inputted into the symbol mapper to generate modulated data comprised of differential bi-orthogonal functions;
   (d) performing a differential encoding for the modulated data to output encoded data;
   (e) converting the encoded data into a serial bit format to generate a baseband signal; and
   (f) processing the baseband signal to generate a transmission signal in a form of the chirp signal sequence with at least two different time gaps applied alternately between subsequent chirp signals.

2. The method as claimed in claim 1, wherein the chirp signal is an up-chirp signal or a down-chirp signal.

3. The method as claimed in claim 1, wherein the chirp signal is comprised of sub-chirp signals into which one chirp signal is equally divided over a time.

4. The method as claimed in claim 3, wherein the sub-chirp signals are an up-chirp signal or a down-chirp signal.

5. The method as claimed in claim 3, wherein the sub-chirp signals are randomly recombined with each other to have a non-linear form.

6. The method as claimed in claim 1, wherein in step (c) of "orthogonally modulating" is performed by using at least one function in a differential bi-orthogonal function set or at least one function in a discrete differential bi-orthogonal function set.

7. The method as claimed in claim 6, wherein the differential bi-orthogonal function set is a complex sinusoidal function.

8. The method as claimed in claim 6, wherein the discrete differential bi-orthogonal function set is a Walsh function.

9. The method as claimed in claim 1, wherein a receiver unit of the digital communication system, which receives the transmission signal, differentially decodes the transmission signal by using the at least two different time gaps allocated thereto to output a moving sum, and detects the input data according to the outputted moving sum.

10. The method as claimed in claim 9, wherein even when transmission signals orthogonally modulated with different orthogonal codes or different time gaps are mixed and inputted into the receiver unit, the receiver unit detects the input data by using an inherent orthogonal code or the at least two different time gaps having been already allocated thereto.

11. An apparatus for performing differential orthogonal modulation in a transmitter unit of a digital communication system by using a chirp signal sequence with at least two different time gaps, the apparatus comprising:
   a serial-to-parallel converter for converting data having a serial bit format to be transmitted by the transmitter unit into a parallel format to generate parallel input data;
   a symbol mapper for receiving the parallel input data from the serial-to-parallel converter and orthogonally modulating the parallel input data to generate modulated data comprised of differential bi-orthogonal functions;
   a differential encoder for differentially encoding the modulated data to output encoded data;

a parallel-to-serial converter for converting the encoded data into a serial bit format to generate a baseband signal; and a chirp signal generator for processing the baseband signal to generate a transmission signal in a form of the chirp signal sequence with at least two different time gaps applied alternately between subsequent chirp signals.

12. The apparatus as claimed in claim 11, wherein the chirp signal is an up-chirp signal or a down-chirp signal.

13. The apparatus as claimed in claim 11, wherein the chirp signal includes sub-chirp signals into which one chirp signal is equally divided over a time.

14. The apparatus as claimed in claim 13, wherein the sub-chirp signals are an up-chirp signal or a down-chirp signal.

15. The apparatus as claimed in claim 13, wherein the sub-chirp signals are randomly recombined with each other to have a non-linear form.

16. The apparatus as claimed in claim 11, wherein the symbol mapper orthogonally modulates the parallel input data by using at least one function in a differential bi-orthogonal function set or at least one function in a discrete differential bi-orthogonal function set.

17. The apparatus as claimed in claim 16, wherein the differential bi-orthogonal function set is a complex sinusoidal function.

18. The apparatus as claimed in claim 16, wherein the discrete differential bi-orthogonal function set is a Walsh function.

19. The apparatus as claimed in claim 11, further comprising a receiver unit of the digital communication system, which receives the transmission signal, wherein the receiver unit includes:

a differential detector for receiving the transmission signal from the transmitter unit, differentially decodes the transmission signal by using the at least two different time gaps to generate output values, and generates a moving sum of the output values;

a selector for selecting a signal, the moving sum of which is maximum, from among the signals generated in the differential detector, and outputs the selected signal; and a symbol de-mapper for detecting the input data by using an orthogonal code mapped with the signal selected in the selector.

20. The apparatus as claimed in claim 19, wherein even when transmission signals orthogonally modulated with different orthogonal codes or different time gaps are mixed and inputted into the receiver unit, the receiver unit detects the input data by using an inherent orthogonal code or the at least two different time gaps having been allocated thereto.

* * * * *